(12) United States Patent
Li et al.

(10) Patent No.: US 10,899,631 B2
(45) Date of Patent: Jan. 26, 2021

(54) FERROUS MODIFIED SELENIUM SOL FOR INHIBITING ACCUMULATION OF CADMIUM AND ARSENIC IN RICE AND PREPARATION METHOD AND APPLICATION THEREOF

(71) Applicant: GUANGDONG INSTITUTE OF ECO-ENVIRONMENTAL SCIENCE & TECHNOLOGY, Guangzhou (CN)

(72) Inventors: Fangbai Li, Guangzhou (CN); Chuanping Liu, Guangzhou (CN); Jianghu Cui, Guangzhou (CN)

(73) Assignee: GUANGDONG INSTITUTE OF ECO-ENVIRONMENTAL SCIENCE & TECHNOLOGY

( * ) Notice: Subject to any disclaimer, the term of this patent is extended or adjusted under 35 U.S.C. 154(b) by 0 days.

(21) Appl. No.: 16/863,442

(22) Filed: Apr. 30, 2020

(65) Prior Publication Data
US 2020/0325037 A1 Oct. 15, 2020

Related U.S. Application Data (63) Continuation of application No. PCT/CN2019/080533, filed on Mar. 29, 2019.

(30) Foreign Application Priority Data

Jul. 24, 2018 (CN) .......................... 2018 1 0816833

(51) Int. Cl.
*C05D 9/02* (2006.01)
*C01G 49/00* (2006.01)
(Continued)

(52) U.S. Cl.
CPC .......... *C01G 49/00* (2013.01); *B01J 13/0013* (2013.01); *B01J 13/0034* (2013.01);
(Continued)

(58) Field of Classification Search
CPC ... B01J 13/0013; B01J 13/0043; C01B 19/02; C01G 49/00; C05D 9/02
See application file for complete search history.

(56) References Cited

U.S. PATENT DOCUMENTS 9,919,978 B2 * 3/2018 Liu .......................... C05D 9/02
10,420,291 B2 * 9/2019 Li ............................ A01G 7/06
(Continued)

FOREIGN PATENT DOCUMENTS

| CN | 103789114 A | 5/2014 |
| CN | 105724428 A | 7/2016 |

(Continued)

OTHER PUBLICATIONS

Xu et al., "Foliar application of selenium-silicon sol reduced arsenic accumulation in rice", Ecology and Environmental Sciences, 2014, pp. 1064-1069, vol. 23, No. 6, abstract only.

*Primary Examiner* — Michael A Salvitti
(74) *Attorney, Agent, or Firm* — The Webb Law Firm (57) ABSTRACT

A ferrous modified selenium sol for inhibiting accumulation of cadmium and arsenic in rice and the preparation method and application thereof are disclosed. The method includes: dissolving an iron-containing compound and a selenium-containing compound into water; adding a reductant to the solution, and stirring until no more precipitation is generated, then adding carbonate, continuing to stir until no more precipitation is generated, and then filtering, taking the precipitation, and washing to obtain the precipitation of the selenium element and ferrous carbonate; adding an emulsifier to a citric acid buffer solution to obtain an emulsified citric acid buffer solution; adding the precipitation of the selenium element and ferrous carbonate to the emulsified citric acid buffer solution to obtain a sol system; and evaporating to concentrate the sol system, and adjusting the
(Continued)

pH to 4.5-8.5 to obtain a ferrous modified selenium sol for inhibiting the accumulation of cadmium and arsenic in rice.

10 Claims, 3 Drawing Sheets

Specification includes a Sequence Listing.

(51) Int. Cl.
    *B01J 13/00*     (2006.01)
    *C01B 19/02*     (2006.01)

(52) U.S. Cl.
    CPC ........... *B01J 13/0043* (2013.01); *C01B 19/02* (2013.01); *C05D 9/02* (2013.01)

(56) References Cited

U.S. PATENT DOCUMENTS

| | | | |
|---|---|---|---|
| 10,633,588 B2 * | 4/2020 | Liu | B09C 1/08 |
| 2004/0091417 A1 * | 5/2004 | Yadav | C05D 3/02 |
| | | | 423/592.1 |
| 2011/0064798 A1 * | 3/2011 | Suvee | A61P 3/00 |
| | | | 424/451 |
| 2012/0276165 A1 * | 11/2012 | Laane | A01N 59/16 |
| | | | 424/400 |
| 2013/0122074 A1 * | 5/2013 | Kerrod | B01J 23/50 |
| | | | 424/411 |
| 2016/0289129 A1 * | 10/2016 | Liu | A01N 59/02 |
| 2018/0119008 A1 * | 5/2018 | Liu | C05G 3/80 |
| 2018/0153109 A1 * | 6/2018 | Li | C05D 9/00 |
| 2018/0355188 A1 * | 12/2018 | Zhang | H01B 19/02 |
| 2020/0325037 A1 * | 10/2020 | Li | B01J 13/0043 |

FOREIGN PATENT DOCUMENTS

| | | |
|---|---|---|
| CN | 105819986 A | 8/2016 |
| CN | 106631520 A | 5/2017 |
| CN | 107318548 A | 11/2017 |
| CN | 107759349 A | 3/2018 |
| CN | 108967442 A | 12/2018 |
| WO | 2015017329 A2 | 2/2015 |
| WO | WO 2020/019748 * | 1/2020 |

* cited by examiner

FERROUS MODIFIED SELENIUM SOL FOR INHIBITING ACCUMULATION OF CADMIUM AND ARSENIC IN RICE AND PREPARATION METHOD AND APPLICATION THEREOF

CROSS-REFERENCE TO RELATED APPLICATIONS

This application is a continuation of International Application No. PCT/CN2019/080533 filed Mar. 29, 2019, and claims priority to Chinese Patent Application No. 201810816833.3 filed Jul. 24, 2018, the disclosures of each of which are hereby incorporated by reference in their entireties.

REFERENCE TO A SEQUENCE LISTING SUBMITTED VIA EFS-WEB

The content of the ASCII text file of the sequence listing named "8692_2002189_ST25" which is 2,450 bytes in size was created on Apr. 23, 2020 and electronically submitted herewith via EFS-Web, and is hereby incorporated by reference in its entirety.

FIELD OF THE INVENTION

The present invention belongs to the field of remediation technology for heavy metal pollution in soil, and particularly relates to a ferrous modified selenium sol for inhibiting the accumulation of cadmium and arsenic in rice and a preparation method and application thereof.

BACKGROUND OF THE INVENTION

The treatment of cadmium and arsenic pollution in soil is a major environmental challenge in China, especially in rice fields. Cadmium and arsenic pollution in rice fields is difficult to control due to many technical bottlenecks. It is difficult to solve the problem of cadmium and arsenic pollution in regional rice fields by using phytoremediation, chemical leaching and other removal technologies. Studies have shown that regulating the absorption and transport of cadmium and arsenic by plants and preventing the accumulation of cadmium and arsenic in rice is a technical approach that is low in cost and easy to apply in large areas and can reduce the content of cadmium and arsenic in agricultural products.

Cadmium, as a nonessential element in rice, can compete for transporters of essential elements such as iron, manganese and zinc or beneficial elements such as silicon and selenium, and enter the roots and move upwards into the grains. The accumulation of cadmium in rice grains mainly involves four processes: root absorption, xylem transport, transvascular bundle transport, and migration from phloem to grains. It has been reported that cadmium can enter plants through the absorption channels of essential elements such as calcium, iron, manganese and zinc, and enter root cells in the form of $Cd^{2+}$ and chelates such as Cd-GSH. Some transporters of the ZIP protein (Zrt/Irt-like protein) family and the NRAMP protein (natural resistance-associated macrophage protein) family are involved in the absorption of cadmium by plant roots. For example, AtIRT1, OsIRT1, OsIRT2, TcZNT1/TcZIP4, TaLCT1, etc. of the ZIP family, and AtNRAMP1, OsNRAMP1, OsNRAMP5, etc. of the NRAMP family are involved in the absorption of cadmium, wherein the transporters of the ZIP family mainly transport iron and zinc and also have the ability to transport cadmium. OsNRAMP1 and OsNRAMP5 are mainly expressed at the roots. OsNRAMP5, located at the polar distal end of the cortex and endothelial cells, is mainly responsible for transporting $Mn^{2+}$ and $Cd^{2+}$ through the Casparian strip for the loading and transport of xylem. Therefore, cadmium competes with essential elements and beneficial elements for the same transporter characteristics, and the application of exogenous substances can regulate the absorption and transport of cadmium in vivo.

Some studies have shown that As (III) must be loaded and unloaded in the root epidermal cells before entering the Casparian strip of the root system, and then loaded and unloaded in the endothelial cells before entering the xylem to transport to the above-ground parts. Transporters for loading As (III) mainly include Lsi1, and transporters for unloading As (III) mainly include Lsi2 (Ma et al., 2006, 2007, 2008). Guo et al. (2009) thought that exogenous silicon and As (III) were both absorbed by rice through the entry of the transporter Lsi1 of the root epidermal cells into the Casparian strip. Therefore, the absorption of As (III) by rice competes with the absorption of silicon, and silicon in rice mainly affects the unloading and transport of As (III) in rice. In plants, silicon and As (III) compete for the unloading transporter Lsi2, which causes rice to retain most of the arsenic absorbed in the root system and inhibit the transport of the arsenic to the above-ground parts thereof (Guo et al., 2009, and Ma et al., 2008).

It has been reported that the absorption of cadmium by rice is closely related to the metabolic pathway of iron. Spraying iron fertilizer on leaves is an important way to improve the iron nutritional status of the plant. Spraying iron fertilizer on leaves can improve the absorption amount and absorption rate of iron by rice, which can increase the transport competition of cadmium and reduce the content of cadmium in rice grains. Rice has a large difference in absorption and utilization rate of iron in different valence states. According to previous studies, rice has a strong ability to absorb divalent iron; however, most of the iron fertilizers on the market are currently poor in water solubility and stability, and they are easily converted to trivalent iron fertilizers in the process of application, which reduces their absorption and utilization rate. Chinese invention patent 200710070666.4 disclosed a method for controlling the accumulation of heavy metal cadmium in rice. This method applied ferrous chelates to the soil at different growth stages of rice, thereby reducing the content of cadmium in rice; however, the application of the ferrous chelates changed the original soil properties and structure, and the amount used was relatively large and the cost was high. Wu Jiangang et al. reported a method of preparing ferrous methionine using methionine, sodium hydroxide and ferrous chloride as main raw materials. The disadvantages of this method included long preparation time, high cost, low yield, and the extremely easy oxidation of ferrous materials, which resulted in a reduced ferrous content, thus leading to a lower content of ferrous methionine. Therefore, how to use a process with low cost, high yield and purity, and simplicity to prepare ferrous methionine with excellent water solubility and stability has become a problem to be solved.

Selenium (Se), an important trace element, is beneficial to organisms at low concentrations and similar to heavy metals in toxicity at high concentrations. Se and S are homologous elements. $SeO_4^{2-}$ and $SO_4^{2-}$ have similar chemical properties, and their absorption, transport and reduction processes share a system. In addition, $SeO_4^{2-}$ can be absorbed by rice into the root system through the Si absorption transporter Lsi1, and $SeO_3^{2-}$ can be absorbed into the root system through the phosphate transporter OsPT2. It has been found that the application of Se fertilizer can effectively reduce the accumulation of heavy metals such as Cd, Zn, Cu, Pb, Hg and As in the above-ground parts of crops. Our previous patents also showed that the application of selenium silica sol on leaves could effectively reduce the accumulation of cadmium and arsenic in rice. But so far, the preparation of ferrous modified selenium sol and the application of the ferrous modified selenium sol to the absorption and accumulation of cadmium and arsenic in rice have not been reported.

CONTENTS OF THE INVENTION

A primary objective of the present invention is to overcome the disadvantages and shortcomings of the prior art, and provide a method of preparing a ferrous modified selenium sol for inhibiting the accumulation of cadmium and arsenic in rice.

Another object of the present invention is to provide a ferrous modified selenium sol prepared by the method for inhibiting the accumulation of cadmium and arsenic in rice.

Yet another object of the present invention is to provide the application of the ferrous modified selenium sol for inhibiting the accumulation of cadmium and arsenic in rice.

The objects of the present invention are achieved through the following technical solution: A method of preparing a ferrous modified selenium sol for inhibiting accumulation of cadmium and arsenic in rice is provided, comprising the following steps:

(1) adding an iron-containing compound and a selenium-containing compound to water, stirring and dissolving to obtain a mixed solution containing iron and selenium;

(2) adding a reductant to the mixed solution containing iron and selenium obtained in step (1) under the condition of a water bath at 35° C. to 85° C., stirring for 5-15 min, adding carbonate when no more precipitation is generated, continuing to stir for 5-15 min until no more precipitation is generated, filtering, taking the precipitation, and washing to obtain the precipitation of the selenium element and ferrous carbonate;

(3) adding an emulsifier to a citric acid buffer solution to obtain an emulsified citric acid buffer solution;

(4) adding the precipitation of the selenium element and ferrous carbonate obtained in step (2) to the emulsified citric acid buffer solution obtained in step (3) under the condition of a water bath at 25° C. to 55° C., and stirring well to obtain a sol system; and (5) evaporating to concentrate the sol system obtained in step (4), and adjusting the pH to 4.5-8.5 to obtain a ferrous modified selenium sol for inhibiting the accumulation of cadmium and arsenic in rice; wherein the content of selenium in the ferrous modified selenium sol is 0.25% to 2.5% (w/v), and the content of iron is 2.5% to 7.5% (w/v).

The iron-containing compound described in step (1) is one of a ferric salt and a ferrous salt, or a mixture thereof.

The ferric salt is preferably ferric chloride, ferric nitrate or ferric citrate.

The ferrous salt is preferably ferrous sulfate or ferrous chloride.

The selenium-containing compound described in step (1) is one or more of selenic acid, selenate, seleninic acid and selenite, and preferably selenite.

The selenite is preferably sodium selenite.

In the mixed solution described in step (1), the mass percentage of the iron element is 5% to 15%, and the mass percentage of the selenium element is 0.5% to 5%.

The temperature of the water bath in step (2) is preferably 45° C. to 55° C.

The reductant described in step (2) is preferably ascorbic acid and/or reduced glutathione.

In step (2), the molar ratio of the reductant to the iron ions in the mixed solution is (1.4-3):1.

The washing in step (2) is carried out with deionized water; preferably, the washing is carried out 3-5 times with deionized water of 10-20 times in mass.

The carbonate described in step (2) is preferably one or more of potassium carbonate, sodium carbonate, and ammonium carbonate.

In step (2), the molar ratio of the carbonate to the iron ions in the mixed solution is (1.0-2.0):1.

The emulsifier described in step (3) is preferably one or more of Triton X-100, sodium alkylbenzenesulfonate, agricultural milk 400 and polyethylene glycol.

The amount of the emulsifier added in step (3) is calculated based on the mass-volume ratio of (1-10):100 of the emulsifier to the citric acid buffer solution.

The citric acid buffer solution described in step (3) is a citric acid-potassium citrate buffer solution with a pH of 3.0-6.0 and a molar concentration of 0.01-0.1 mol/L. It is preferably obtained through the following steps:

(I) Citric acid ($C_6H_8O_7 \cdot H_2O$) is dissolved in deionized water to a volume of 1 L to obtain a citric acid solution, wherein the molar concentration of the citric acid solution is 0.01-0.1 mol/L;

(II) potassium citrate ($C_6H_5K_3O_7$) is dissolved in deionized water to a volume of 1 L to obtain a potassium citrate solution, wherein the molar concentration of the potassium citrate solution is 0.01-0.1 mol/L; and (III) the citric acid solution and the potassium citrate solution are mixed uniformly to obtain a citric acid buffer solution, wherein the pH and the molar concentration of the citric acid buffer solution are 3.0-6.0 and 0.01-0.1 mol/L, respectively.

In step (4), the stirring rate is 50-100 r/min.

The addition of the precipitation of the selenium element and ferrous carbonate described in step (4) is preferably achieved by the following method: The precipitation of the selenium element and ferrous carbonate is slowly and uniformly added to the emulsified citric acid buffer solution; the speed of addition is controlled so that the amount of precipitation added per liter of the solution is 5-10 g/min until a uniform sol system is formed.

The added amount of the precipitation of the selenium element and ferrous carbonate described in step (4) is calculated based on the mass-volume ratio of 1:(10-100) of the precipitation of the selenium element and ferrous carbonate to the emulsified citric acid buffer solution.

The pH range in step (5) is preferably 5.5-6.5.

A ferrous modified selenium sol for inhibiting the accumulation of cadmium and arsenic in rice is prepared by any of the above methods.

The ferrous modified selenium sol for inhibiting the accumulation of cadmium and arsenic in rice is applied in the field of heavy metal pollution treatment technology.

The ferrous modified selenium sol for inhibiting the accumulation of cadmium and arsenic in rice is applied in the field of heavy metal pollution treatment technology through the following steps:

After the above ferrous modified selenium sol for inhibiting the accumulation of cadmium and arsenic in rice is diluted with water, it is atomizingly sprayed 1-3 times onto rice leaves at the tillering, jointing, and/or filling stages of the rice, which is performed at 4-6 pm in sunny or cloudy days.

The volume ratio of the ferrous modified selenium sol for inhibiting the accumulation of cadmium and arsenic in rice to water is 1:(50-250), preferably 1:(100-150); and the spraying dose of the ferrous modified selenium sol for inhibiting the accumulation of cadmium and arsenic in rice after dilution is 50-150 L/mu.

The conditions of the atomizing spraying are preferably as follows: The atomizing water droplets are controlled to be smaller than 1000 microns, and sprayed uniformly on both sides of the rice leaves.

The present invention has the following advantages and effects with respect to the prior art:

1. The ferrous modified selenium sol of the present invention has a simple preparation process and a wide range of material sources, and can be produced industrially on a large scale; the cost of spraying a barrier on the leaves is only 500-1500 RMB yuan/ha, which is 10% of the cost of casting a soil passivator.

2. The ferrous modified selenium sol prepared by the present invention has high dispersion, uniform and fine particles, good stability, and reduced content of impurities in this sol product by the precipitation washing technology; and it can be easily absorbed and used by plants due to strong foliar adhesion.

3. According to the transport mechanism of iron, selenium, cadmium, arsenic and other elements in rice, the present invention starts with regulating the stem-and-leaf distribution, regulating the cadmium and arsenic transporter activity, and competing for the transport channels, etc., and then sprays exogenous iron, selenium and other elements on the leaves, and regulates the key genes for cadmium and arsenic transport, thereby reducing the content of cadmium and arsenic in rice; the barrier has a simple preparation process and can effectively inhibit the transfer of cadmium and arsenic from rice stems and leaves to grains, having a low cost, being easy to apply in a large area and directly improving the safety of crops.

4. The ferrous modified selenium sol of the present invention can improve the capability of a selenium sol in reducing the absorption of cadmium in rice, and the selenium sol can also reduce the absorption and accumulation of arsenic in rice; therefore, the ferrous modified selenium sol can make up for the deficiency of their separate application, and give full play to its ability to inhibit the absorption of cadmium and arsenic by rice.

BRIEF DESCRIPTION OF THE DRAWINGS

FIG. 1 is a particle size distribution diagram of the ferrous modified selenium sol according to the present invention.

FIG. 2 is a transmission electron micrograph of the ferrous modified selenium sol according to the present invention.

FIG. 3 is an electron spectroscopy graph of the ferrous modified selenium sol according to the present invention.

FIG. 4 shows the content of cadmium in rice whose leaves have been sprayed with the respective foliar barriers.

FIG. 5 shows the content of inorganic arsenic in rice whose leaves have been sprayed with the respective foliar barriers.

DETAILED DESCRIPTION OF THE EMBODIMENTS

The present invention will be further described in detail with reference to examples, but the embodiments of the present invention are not limited thereto.

Example 1: Preparation of Ferrous Modified Selenium Sol I (1) Preparation of mixed solution containing iron and selenium: weighing 14.5 g of ferric chloride (containing 5 g of the iron element) and 1 g of sodium selenite (containing 0.5 g of the selenium element), adding 84.5 mL of deionized water thereto, stirring well, and fully dissolving to obtain a mixed solution containing iron and selenium;

(2) controlling the temperature of the above mixed solution at 35° C. in a water bath, slowly adding 47 g of ascorbic acid (at a molar ratio of 3:1 to the iron ion in the mixed solution) to the mixed solution while stirring, and continuing stirring for 5 min after the addition; when pink precipitation was no longer produced, slowly adding 24.6 g of potassium carbonate (at a molar ratio of 2:1 to the iron ion in the mixed solution) while stirring, and continuing stirring for 5 min after the addition until no more precipitation was produced; filtering the precipitation and washing 5 times with deionized water of 10 times in mass to obtain a clean precipitation (about 10.86 g of a mixture of ferrous carbonate and selenium element);

(3) preparation of emulsified citric acid buffer solution: weighing 21.01 g of citric acid ($C_6H_8O_7.H_2O$) and 30.64 g of potassium citrate ($C_6H_5K_3O_7$) respectively, fully dissolving them in deionized water respectively to a volume of 1 L to obtain a citric acid solution and a potassium citrate solution; then taking 930 mL of the citric acid solution and 70 mL of the potassium citrate solution respectively, and thoroughly mixing them to obtain 1000 mL of a 0.1 mol/L citric acid buffer solution with a pH of 3.0; adding 50 g of polyethylene glycol and 50 g of sodium alkylbenzenesulfonate to the above buffer solution, and stirring well to obtain an emulsified citric acid buffer solution;

(4) slowly adding the precipitation obtained in step (2) to the emulsified citric acid solution obtained in step (3) at a rate of 5 g/min under the condition of a water bath at a temperature of 25° C. and a stirring rate of 50 r/min, and then continuing stirring for 10 min after the addition until a uniform sol system was formed; and (5) concentrating the sol by rotary evaporation to 200 mL, and adjusting its pH to 4.5 with potassium hydroxide to obtain a ferrous modified selenium sol having an iron content of 2.5% (mass-volume ratio) and a selenium content of 0.25% (mass-volume ratio).

Example 2: Preparation of Ferrous Modified Selenium Sol II (1) Preparation of mixed solution containing iron and selenium: weighing 11.34 g of ferric chloride (containing 5 g of the iron element), 21.61 g of ferric nitrate (containing 5 g of the iron element), 21.88 g of ferric citrate (containing 5 g of the iron element), 2.25 g of selenic acid (containing 1.25 g of the selenium element), and 2.04 g of seleninic acid (containing 1.25 g of the selenium element), adding 141 mL of deionized water thereto, stirring well, and fully dissolving to obtain a mixed solution containing iron and selenium;

(2) controlling the temperature of the above mixed solution at 85° C. in a water bath, slowly adding 66 g of ascorbic acid (at a molar ratio of 1.4:1 to the iron ion in the mixed solution) and 10.28 g of reduced glutathione (at a molar ratio of 0.1:1 to the iron ion in the mixed solution) to the mixed solution while stirring, and continuing stirring for 15 min after the addition; when pink precipitation was no longer produced, slowly adding 25.71 g of ammonium carbonate (at a molar ratio of 1:1 to the iron ion in the mixed solution) while stirring, and continuing stirring for 15 min after the addition until no more precipitation was produced; filtering the precipitation and washing 3 times with deionized water of 20 times in mass to obtain a clean precipitation (about 33.58 g of a mixture of ferrous carbonate and selenium element);

(3) preparation of emulsified citric acid buffer solution: weighing 2.1 g of citric acid ($C_6H_8O_7 \cdot H_2O$) and 3.06 g of potassium citrate ($C_6H_5K_3O_7$) respectively, fully dissolving them in deionized water respectively to a volume of 1 L to obtain a citric acid solution and a potassium citrate solution; then taking 64 mL of the citric acid solution and 272 mL of the potassium citrate solution respectively, and thoroughly mixing them to obtain 336 mL of a 0.01 mol/L citric acid buffer solution with a pH of 6.0; adding 16.8 g of agricultural milk 400 and 16.8 g of Triton X-100 to the above buffer solution, and stirring well to obtain an emulsified citric acid buffer solution;

(4) slowly adding the precipitation obtained in step (2) to the emulsified citric acid solution obtained in step (3) at a rate of 3.36 g/min under the condition of a water bath at a temperature of 25° C. and a stirring rate of 100 r/min, and then continuing stirring for 30 min after the addition until a uniform sol system was formed; and (5) concentrating the sol by rotary evaporation to 200 mL, and adjusting its pH to 8.5 with potassium hydroxide to obtain a ferrous modified selenium sol having an iron content of 7.5% (mass-volume ratio) and a selenium content of 1.25% (mass-volume ratio).

Example 3: Preparation of Ferrous Modified Selenium Sol III (1) Preparation of mixed solution containing iron and selenium: weighing 27.1 g of ferrous sulfate (containing 10 g of the iron element) and 10 g of sodium selenite (containing 5 g of the selenium element), adding 63 mL of deionized water thereto, stirring well, and fully dissolving to obtain a mixed solution containing iron and selenium;

(2) controlling the temperature of the above mixed solution at 50° C. in a water bath, slowly adding 62.86 g of ascorbic acid (at a molar ratio of 2:1 to the iron ion in the mixed solution) while stirring, and continuing stirring for 10 min after the addition; when pink precipitation was no longer produced, slowly adding 24.6 g of potassium carbonate and 18.9 g of sodium carbonate (at a molar ratio of 1:1 to the iron ion in the mixed solution) while stirring, and continuing stirring for 10 min after the addition until no more precipitation was produced; filtering the precipitation and washing 4 times with deionized water of 15 times in mass to obtain a clean precipitation (about 25.71 g of a mixture of ferrous carbonate and selenium element);

(3) preparation of emulsified citric acid buffer solution: weighing 11.55 g of citric acid ($C_6H_8O_7 \cdot H_2O$) and 15.32 g of potassium citrate ($C_6H_5K_3O_7$) respectively, fully dissolving them in deionized water respectively to a volume of 1 L to obtain a citric acid solution and a potassium citrate solution; then taking 533 mL of the citric acid solution and 767 mL of the potassium citrate solution respectively, and thoroughly mixing them to obtain 1300 mL of a 0.05 mol/L citric acid buffer solution with a pH of 5.0; adding 65 g of sodium alkylbenzenesulfonate to the above buffer solution, and stirring well to obtain an emulsified citric acid buffer solution;

(4) slowly adding the precipitation obtained in step (2) to the emulsified citric acid solution obtained in step (3) at a rate of 10 g/min under the condition of a water bath at a temperature of 40° C. and a stirring rate of 70 r/min, and then continuing stirring for 15 min after the addition until a uniform sol system was formed; and (5) concentrating the sol by rotary evaporation to 200 mL, and adjusting its pH to 6.0 with potassium hydroxide to obtain a ferrous modified selenium sol having an iron content of 5% (mass-volume ratio) and a selenium content of 2.5% (mass-volume ratio).

Figure 1:
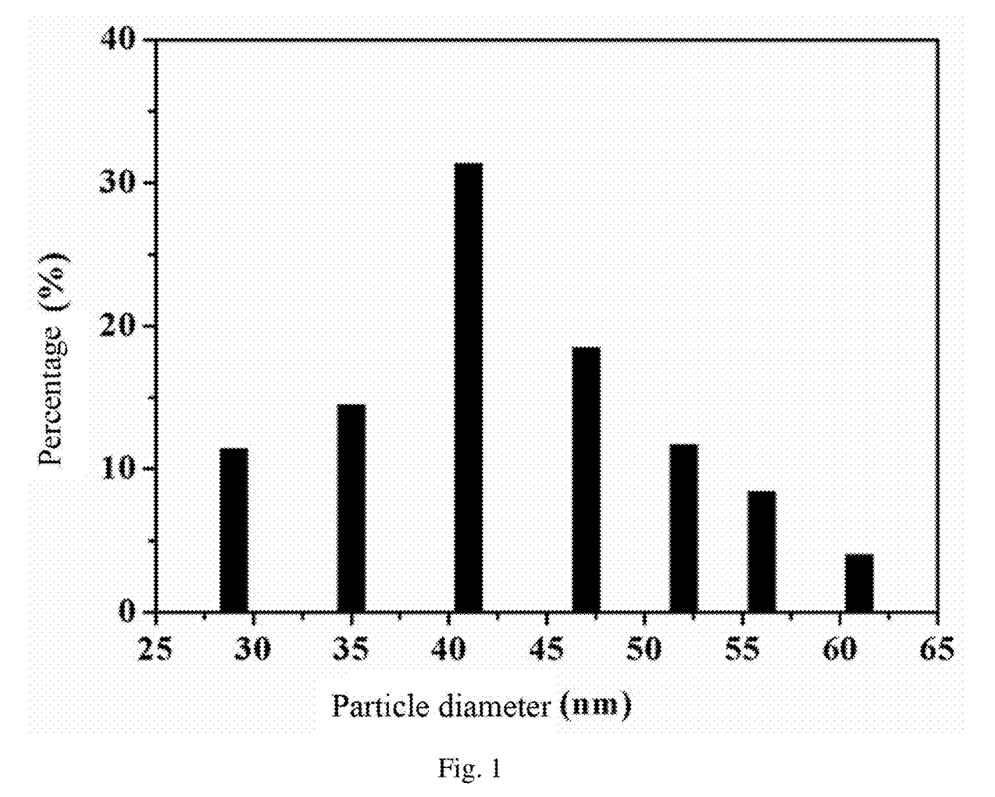
Figure 2:
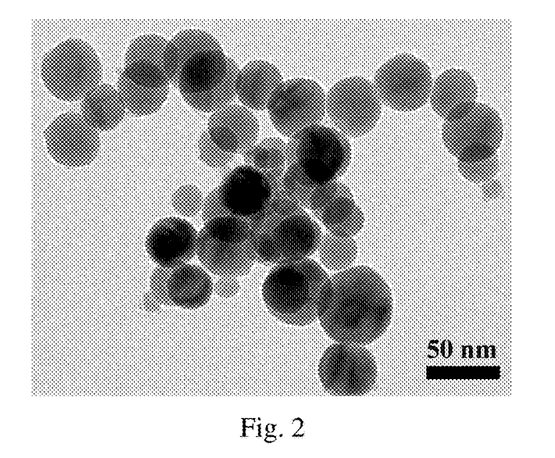
Figure 3:
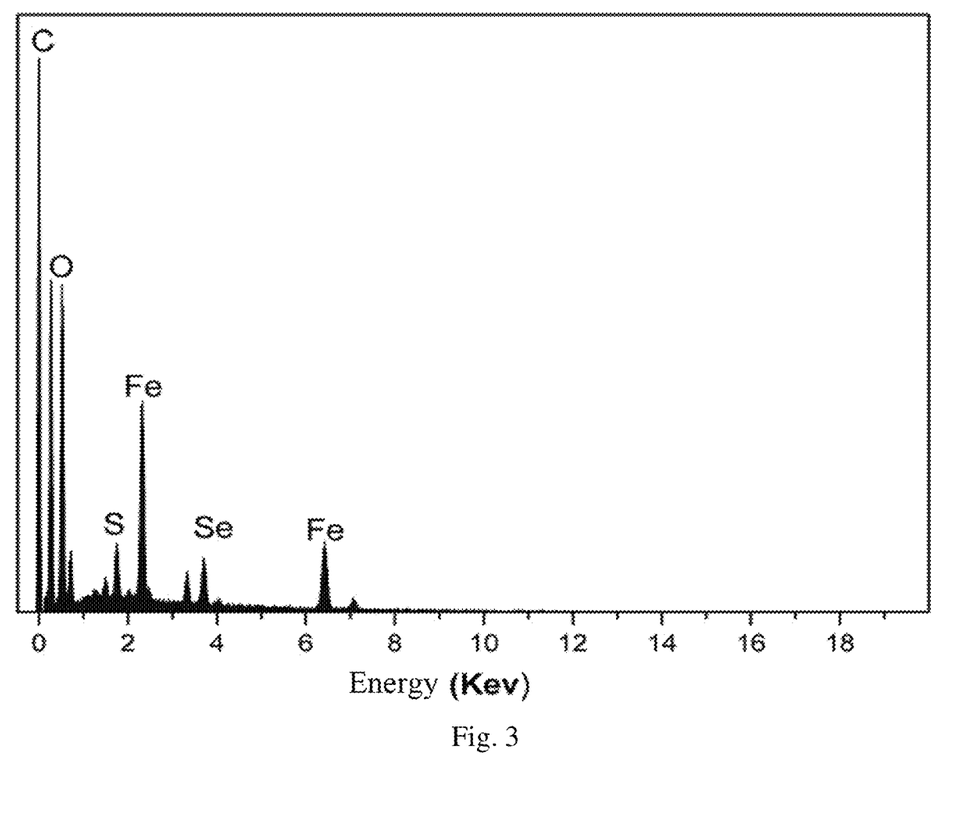

The above ferrous modified selenium sol sample was diluted 10 times with deionized water before being dropped on a net containing copper and dried at room temperature. The sample was observed with a Philips TECNAI-10 projection electron microscope (having an acceleration voltage of 100 kV), and the elements in the sample were analyzed qualitatively and semi-quantitatively with an X-ray energy spectrum analyzer. From the results of particle size distribution and transmission electron microscopy (TEM), it could be found that the selenium and organic iron were tightly compounded, and the particles were spherical and uniformly about 40 nm in size (FIGS. 1 and 2). Besides, it could be found through the electron spectroscopy graph (FIG. 3) that the material mainly contained such elements as carbon, hydrogen, oxygen, selenium and iron, while elements such as sodium and chlorine not conducive to plant growth could not be detected. The contents of iron and other elements in the material were shown in Table 1. The results indicated that the ferrous modified selenium sol product prepared by the method of the present invention had a less content of impurities due to the use of precipitation washing technology.

TABLE 1

Content analysis of elements in ferrous modified selenium sol samples

| Element | Content (w/w) % |
| --- | --- |
| C | 44.14 |
| Fe | 10.71 |
| O | 18.41 |
| H | 1.95 |
| Se | 4.88 |
| S | 4.99 |
| K | 2.33 |

Example 4: Effects of Ferrous Modified Selenium Sol on the Expression Level of Cadmium and Arsenic Transporter and the Content of Cadmium and Arsenic in Rice Suspension Cells Method of culturing rice suspension cells (*Oryza sativa* L. Japonica): Selecting mature and plump seeds of Japanese rice Nipponbare, and disinfecting them with 70% alcohol by volume or 30% sodium hypochlorite by mass; evenly sowing the seeds with tweezers onto a plate containing a solid medium, and then placing the plate into an incubator to culture in the dark at a culture temperature of 25° C.; after a period of time, removing hypocotyls from the seeds with tweezers, and culturing the hypocotyls in another solid medium to obtain callus; crushing 10 g of the callus, adding it to a triangular flask containing a liquid medium (50 mL), and culturing in a shaker at 28° C. for about one month to obtain rice suspension cells.

The basic components of the above solid medium and liquid medium are consistent, both being an MS medium. The solid medium was prepared by adding agar to the liquid medium (adding 10 g of agar to 100 ml of the liquid medium, and then heating, melting, cooling and solidifying to obtain the solid medium). The basic formula was as follows:

TABLE 2

Basic components of MS

| Component | Concentration (mg $L^{-1}$) | Component | Concentration (mg $L^{-1}$) |
|---|---|---|---|
| $CaCl_2 \cdot 2H_2O$ | 440 | $FeSO_4 \cdot 7H_2O$ | 27.85 |
| $KH_2PO_4$ | 170 | $Na_2EDTA$ | 37.25 |
| $MgSO_4 \cdot 7H_2O$ | 370 | 2,4-D | 1 |
| KCl | 2940 | Inositol (myo-Inositol) | 100 |
| KI | 0.83 | Thiamine Hydrochloride | 0.5 |
| $CoCl_2 \cdot 6H_2O$ | 0.025 | Glycine | 75 |
| $H_3BO_3$ | 6.2 | L-Glutamine | 877 |
| $Na_2MoO_4 \cdot 2H_2O$ | 0.25 | L-Aspartic acid | 266 |
| $MnSO_4 \cdot 4H_2O$ | 22.3 | L-Arginine | 228 |
| $CuSO_4 \cdot 5H_2O$ | 0.025 | Sucrose | 30,000 |
| $ZnSO_4 \cdot 7H_2O$ | 8.6 | pH | 5.6 |

In order to study the effect of the ferrous modified selenium sol on the expression level of the cadmium transporter in rice suspension cells, the following treatments were performed on the rice suspension cells:

Ferrous sulfate, sodium selenite and the ferrous modified selenium sol prepared in Examples 1, 2 and 3 were added to a rice suspension cell system, respectively, so that in the final system the ferrous sulfate solution containing the iron element at a mass-volume ratio of 0.05% (T1), the sodium selenite solution containing the selenium element at a mass-volume ratio of 0.025% (T2), and the ferrous modified selenium sol prepared in Example 1 (T3) were diluted 50 times, the ferrous modified selenium sol prepared in Example 2 was diluted 150 times (T4), and the ferrous modified selenium sol prepared in Example 3 was diluted 100 times (T5). The rice suspension cells without any treatment were used as a control (CK). After 24 h of culture, cadmium and arsenic were added to the culture system, so that the final concentrations of cadmium and arsenic were 10 μM and 5 μM, respectively. With the temperature kept constant at 28° C. in a shaker, the rice cells of each treatment were continuously cultured for 24 h and then collected. RNA was extracted from the rice cells and reversely transcribed, and the expression levels of the genes OsNramp5, OsHMA3, OsLCT1, OsLsi1 and OsLsi2 were detected. The analysis results of real-time fluorescence quantitative PCR (see Table 4 for the PCR primers of the above genes) showed that all the treatments could activate the expression of the cadmium detoxification gene OsHMA3 in rice cells, inhibit the expression levels of the genes Nramp5 and OsLCT1 related to the absorption and transport of cadmium, and significantly inhibit the expression levels of the genes OsLsi1 and OsLsi2 related to the absorption and transport of arsenic. Among them, the ferrous modified selenium sol prepared in Example 3 (T5) had the best effect; compared with the control (CK), the activity of OsHMA3 increased by 293%, and the expression activities of OsNramp5, OsLCT1, OsLsi1 and OsLsi2 decreased by 78.5%, 73.8%, 73.2% and 65.2%, respectively. Compared with the blank control and the use of ferrous sulfate and sodium selenite alone, the treatment of the rice suspension cells with the ferrous modified selenium sol (the three ferrous modified selenium sols prepared in Examples 1, 2 and 3) more significantly activated the expression level of the cadmium detoxification gene OsHMA3 in the cells, and more significantly inhibited the expression level of OsNramp5, OsLCT1, OsLsi1 and OsLsi2. Therefore, the ferrous modified selenium sol could significantly regulate the expression of cadmium and arsenic related transporters in rice cells, thereby blocking the absorption and transport of cadmium and arsenic by rice. See Table 3 for details.

TABLE 3

Effect of ferrous modified selenium sol on the expression of cadmium transporter in rice suspension cells

| | CK | T1 | T2 | T3 | T4 | T5 |
|---|---|---|---|---|---|---|
| OsHMA3 | 1.47 ± 0.07 | 2.53 ± 0.12 | 2.15 ± 0.14 | 4.21 ± 0.09 | 4.03 ± 017 | 5.78 ± 0.14 |
| OsNramp5 | 4.84 ± 0.15 | 3.15 ± 0.16 | 3.85 ± 0.21 | 1.24 ± 0.10 | 1.21 ± 0.19 | 1.04 ± 0.06 |
| OsLCT1 | 4.62 ± 0.10 | 3.82 ± 0.11 | 4.42 ± 0.14 | 2.36 ± 0.13 | 2.17 ± 0.11 | 1.21 ± 0.08 |
| OsLsi1 | 4.74 ± 0.11 | 4.15 ± 0.16 | 3.11 ± 0.17 | 2.54 ± 0.07 | 2.31 ± 0.17 | 1.27 ± 0.06 |
| OsLsi2 | 4.91 ± 0.21 | 4.78 ± 0.27 | 3.07 ± 0.11 | 2.78 ± 0.14 | 2.92 ± 0.12 | 1.71 ± 0.09 |

TABLE 4

Primers for identifying cadmium and arsenic related genes transported in rice

| Gene name | Primer sequence forward (5'-3') | Primer sequence backward (5'-3') |
|---|---|---|
| OsNramp5 | TGAGCTGCTC TGGGTGATTC (SEQ ID NO. 1) | TGCCAGCAGC CATAGGAAAA (SEQ ID NO. 2) |
| OsLCT1 | TGGCGATCTT TGGAGGCTTT (SEQ ID NO. 3) | CGCCGAGGTC GATAAGAACA (SEQ ID NO. 4) |
| OsHMA3 | AGAACAGCAG GTCGAAGACG (SEQ ID NO. 5) | ATTGCTCAAG GCCATCTGCT (SEQ ID NO. 6) |
| OsLsi1 | CGGTGGATGTG ATCGGAACCA (SEQ ID NO. 7) | CGTCGAACTTG TTGCTCGCCA (SEQ ID NO. 8) |
| OsLsi2 | ATCTGGGACT TCATGGCCC (SEQ ID NO. 9) | ACGTTTGATG CGAGGTTGG (SEQ ID NO. 10) |

The rice cells obtained by the above respective treatments were collected and washed centrifugally with ultrapure water, and then the contents of cadmium and arsenic in the cells were measured. The results showed that all the treatments could reduce the concentration of cadmium and arsenic in rice cells to a certain extent. Compared with the blank control, the inhibition rates of cadmium by ferrous sulfate (T1), sodium selenite (T2) and the ferrous modified selenium sols of Examples 1, 2 and 3 (respectively T3, T4 and T5) were 35.2%, 28.9%, 66.4%, 68.0% and 75.0%, respectively, and the inhibition rates of arsenic were 3.2%, 30.3%, 61.0%, 62.5% and 78.4%, respectively. The results indicated that the ferrous modified selenium sols prepared by the present invention had a significantly higher inhibition effect on cadmium and arsenic in rice cells than the ferrous sulfate and sodium selenite alone, and could significantly inhibit the absorption and transport of cadmium and arsenic by rice, with the ferrous modified selenium sol prepared in Example 3 having the most significant effect in reducing the accumulation of cadmium and arsenic in rice cells. See Table 5 for specific values.

TABLE 5

Content of cadmium in rice suspension cells obtained from respective treatments

| Treatment | Cd Content (μg/g) | Cd reduction ratio (%) | As content (μg/g) | As reduction ratio (%) |
|---|---|---|---|---|
| CK | 12.8 ± 0.9 |  | 7.12 ± 0.82 |  |
| T1 | 8.3 ± 0.6 | 35.2 | 6.89 ± 0.71 | 3.2 |
| T2 | 9.1 ± 1.2 | 28.9 | 4.96 ± 0.53 | 30.3 |
| T3 | 4.3 ± 0.7 | 66.4 | 2.78 ± 0.64 | 61.0 |
| T4 | 4.1 ± 0.4 | 68.0 | 2.67 ± 0.24 | 62.5 |
| T5 | 3.2 ± 0.2 | 75.0 | 1.54 ± 0.37 | 78.4 |

Example 5: Effects of Various Foliar Barriers on Reducing Accumulation of Cadmium and Inorganic Arsenic in Rice Grains Under Field Conditions The surface soil (0-30 cm) of a rice field polluted by heavy metals located in Boluo Town, Huizhou City, Guangdong Province was collected and analyzed from April to July of 2016. The results showed that the soil had a pH of about 6.16, a Cd content of about 0.408 mg kg$^{-1}$, and an As content of 40.1 mg kg$^{-1}$. The tested rice variety was Huang-Li-Zhan.

There were the following six treatments in the experiment: (1) Blank control (CK): An equal amount of clear water was sprayed. (2) Treatment 1 (T1): The silica sol foliar barrier (prepared in Example 3) was sprayed once on the leaves at the tillering stage of rice when the foliar barrier was diluted 50 times and sprayed at 100 L/mu. (3) Treatment 2 (T2): The selenium sol foliar barrier (prepared in Example 3) was sprayed twice on the leaves, the first at the tillering stage of rice when the foliar barrier was diluted 100 times and sprayed at 50 L/mu, the second at the heading stage of rice when the foliar barrier was diluted 100 times and sprayed at 150 L/mu. (4) Treatment 3 (T3): The selenium sol foliar barrier (prepared in Example 3) was sprayed three times on the leaves, the first at the tillering stage of rice when the foliar barrier was diluted 100 times and sprayed at 80 L/mu, the second at the heading stage of rice when the foliar barrier was diluted 100 times and sprayed at 120 L/mu, the third at the filling stage of rice when the foliar barrier was diluted 250 times and sprayed at 150 L/mu. (5) Treatment 4 (T4): The ferrous sulfate solution containing the iron element at a mass-volume ratio of 0.1% was sprayed on the leaves at the tillering stage of rice at 100 L/mu. (6) Treatment 5 (T5): The sodium selenite solution containing the selenium element at a mass-volume ratio of 0.05% was sprayed on the leaves at the tillering stage of rice at 100 L/mu.

It was selected that the above foliar preparations were sprayed at 4-6 pm on a sunny day; when sprayed, the atomized droplets were controlled to be smaller than 1000 microns, and sprayed uniformly on both sides of the rice leaves. Each treatment was repeated four times, randomly arranged. There were totally 36 test plots, each plot having an area of 5×6=30 m$^2$ to ensure independent drainage and irrigation.

As shown in Table 6, except for sodium selenite, the yield of rice treated with different foliar barriers increased. Among them, T2 treatment had the most significant effect on increasing the yield, which was significantly increased by 14.8% compared with the control. There was no significant difference between the other treatments and the control in the yield. Compared with spraying rice leaves with the ferrous sulfate (T4) and the sodium selenite (T5), spraying rice leaves with the ferrous modified selenium sol prepared in the present invention had a better yield increasing effect on rice; after the ferrous modified selenium sol was sprayed at different periods (T1, T2, T3), the yield of rice increased by 12.3%, 14.8% and 10.6%, respectively. However, the yield of rice increased by only 6.4% after the rice leaves were sprayed with the ferrous sulfate (T4), and decreased by 3.8% after the rice leaves were sprayed with the sodium selenite (T5). These results indicated that the ferrous modified selenium sol prepared in the present invention had a unique yield increasing effect.

TABLE 6

Statistical results of early matured rice yield in 2016

|  | Plot yield (kg) | | | | Plot average yield (kg) | Wet production per mu (kg) | Dry production per mu (kg) | Yield increase ratio (%) |
|---|---|---|---|---|---|---|---|---|
| Treatment | I | II | III | IV |  |  |  |  |
| CK | 28.65 | 30.15 | 28.95 | 24.3 | 28.05bc | 623 | 386 | — |
| T1 | 29.1 | 36.45 | 31.95 | 27.9 | 31.35ab | 697 | 433 | 12.3 |
| T2 | 36.6 | 33.15 | 35.1 | 27 | 32.96a | 733 | 443 | 14.8 |
| T3 | 31.95 | 31.2 | 28.2 | 30.6 | 30.49abc | 678 | 426 | 10.6 |
| T4 | 29.4 | 30.75 | 30.3 | 29.7 | 30.04abc | 668 | 410 | 6.4 |
| T5 | 25.41 | 27.15 | 29.12 | 26.13 | 26.95c | 599 | 371 | -3.8 |

Note:
letters of a, b, and c in the table indicate a significant difference at p < 0.05.

Figure 4:
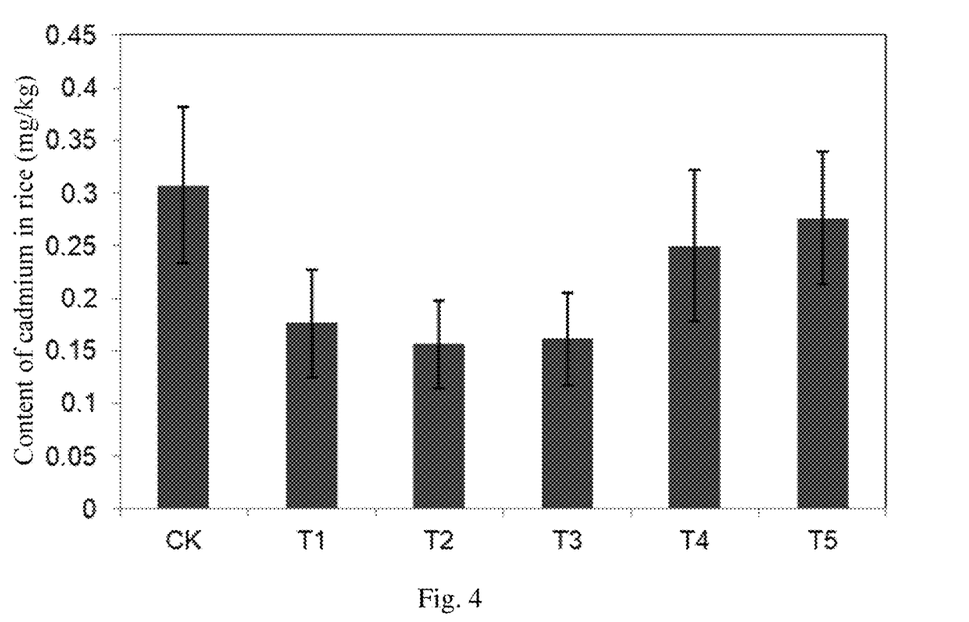
Figure 5:
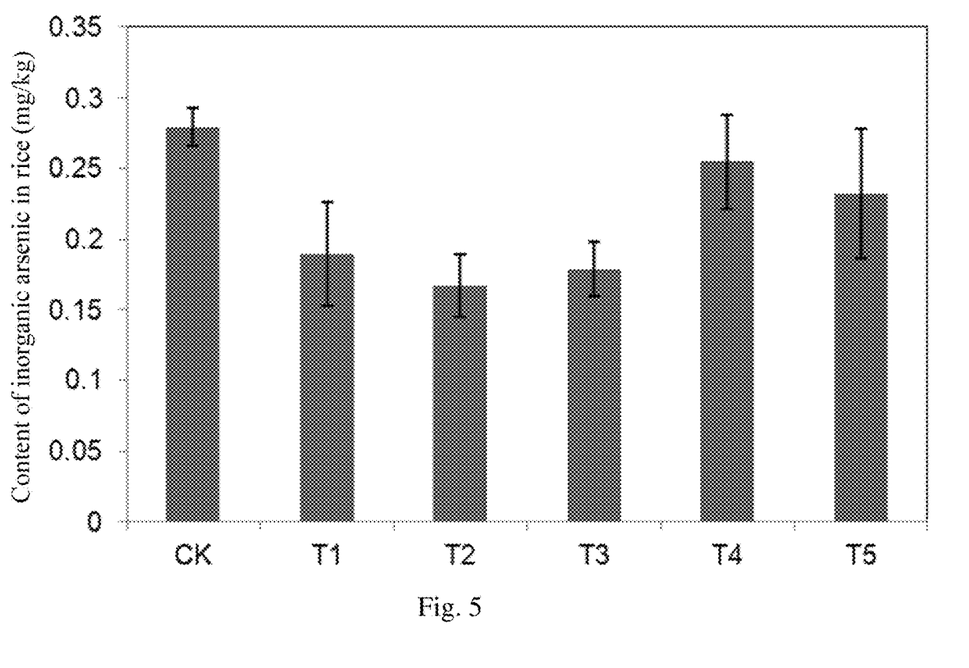

As shown in FIGS. 4 and 5, the application of the foliar barrier could significantly reduce the content of cadmium and inorganic arsenic in rice. Compared with the control (CK), the content of cadmium in rice treated by T1, T2, T3, T4 and T5 decreased by 42.8%, 49.3%, 47.6%, 18.8% and 10.1%, respectively, and the content of inorganic arsenic in rice decreased by 32.2%, 40.0%, 35.8%, 18.7% and 16.8%, respectively. The effects of spraying the ferrous modified selenium sol foliar barriers (T1, T2 and T3) on reducing the content of cadmium and inorganic arsenic in rice were significantly better than those of spraying the ferrous sulfate (T4) and sodium selenite (T5), with spraying once respectively at the tillering and heading stages of rice (T2) having the best effect. After the ferrous modified selenium sol was sprayed once at the tillering stage of rice (T1), sprayed once respectively at the tillering stage and heading stage (T2), and sprayed once respectively at the tillering stage, heading stage and filling stage (T3), the content of cadmium in rice decreased from 0.308 mg/kg for the control to 0.176 mg/kg, 0.156 mg/kg and 0.161 mg/kg, respectively, and the content of inorganic arsenic in rice decreased from 0.280 mg/kg for the control to 0.189 mg/kg, 0.167 mg/kg and 0.179 mg/kg, respectively, with the rice all reaching the national food hygiene standard after the application of the ferrous modified selenium sol. However, although the application of the ferrous sulfate and sodium selenite could also reduce the content of cadmium and inorganic arsenic in rice, the content of cadmium in the treated rice was 0.250 mg/kg and 0.276 mg/kg, respectively, and the content of inorganic arsenic was 0.255 mg/kg and 0.232 mg/kg, respectively, which still exceeded the food hygiene standard. Therefore, these results indicated that the ferrous modified selenium sol foliar barrier technology of the present invention could achieve safe rice production on moderately and slightly polluted rice fields.

The above examples are preferred embodiments of the present invention, but the embodiments of the present invention are not limited thereto, and any other alterations, modifications, replacements, combinations and simplifications made without departing from the spirit and principle of the present invention should all be equivalent substitutions and included in the scope of protection of the present invention.

The invention claimed is:

1. A method of preparing a ferrous modified selenium sol for inhibiting accumulation of cadmium and arsenic in rice, comprising:
   (1) adding an iron-containing compound and a selenium-containing compound to water, and stirring and dissolving to obtain a mixed solution containing iron and selenium;
   (2) adding a reductant to the mixed solution containing iron and selenium obtained in step (1) under the condition of a water bath at 35° C. to 85° C., stirring for 5-15 minutes, adding carbonate when no more precipitation is generated, continuing to stir for 5-15 minutes until no more precipitation is generated, filtering, taking the precipitation, and washing to obtain the precipitation of elemental selenium and ferrous carbonate;
   (3) adding an emulsifier to a citric acid buffer solution to obtain an emulsified citric acid buffer solution;
   (4) adding the precipitation of the elemental selenium and ferrous carbonate obtained in step (2) to the emulsified citric acid buffer solution obtained in step (3) under the condition of a water bath at 25° C. to 55° C., and stirring to obtain a sol system; and
   (5) evaporating to concentrate the sol system obtained in step (4), and adjusting the pH to 4.5-8.5 to obtain a ferrous modified selenium sol for inhibiting the accumulation of cadmium and arsenic in rice, wherein the content of selenium in the ferrous modified selenium sol is 0.25% to 2.5% (w/v), and the content of iron is 2.5% to 7.5% (w/v).

2. The method of claim 1, wherein:
   in the mixed solution described in step (1), the mass percentage of the iron element is 5% to 15%, and the mass percentage of the elemental selenium is 0.5% to 5%.

3. The method of claim 1, wherein:
   the citric acid buffer solution described in step (3) is a citric acid-potassium citrate buffer solution with a pH of 3.0-6.0 and a molar concentration of 0.01-0.1 mol/L.

4. The method of claim 3, wherein:
   the citric acid buffer solution described in step (3) is obtained by the following steps:
   (I) citric acid ($C_6H_8O_7 \cdot H_2O$) is dissolved in deionized water to a volume of 1 L to obtain a citric acid solution, wherein the molar concentration of the citric acid solution is 0.01-0.1 mol/L;
   (II) potassium citrate ($C_6H_5K_3O_7$) is dissolved in deionized water to a volume of 1 L to obtain a potassium citrate solution, wherein the molar concentration of the potassium citrate solution is 0.01-0.1 mol/L; and
   (III) the citric acid solution and the potassium citrate solution are mixed uniformly to obtain the citric acid buffer solution, wherein the pH and the molar concentration of the citric acid buffer solution are 3.0-6.0 and 0.01-0.1 mol/L, respectively.

5. The method of claim 1, wherein:
   in step (2), the molar ratio of the reductant to the iron ions in the mixed solution is (1.4-3):1;
   in step (2), the molar ratio of the carbonate to the iron ions in the mixed solution is (1.0-2.0):1;
   the amount of the emulsifier added in step (3) is calculated based on the mass-volume ratio of (1-10):100 of the emulsifier to the citric acid buffer solution; and
   the added amount of the precipitation of the elemental selenium and ferrous carbonate described in step (4) is calculated based on the mass-volume ratio of 1:(10-100) of the precipitation of the elemental selenium and ferrous carbonate to the emulsified citric acid buffer solution.

6. The method of claim 1, wherein:
   the reductant described in step (2) is ascorbic acid and/or reduced glutathione;
   the carbonate described in step (2) is one or more of potassium carbonate, sodium carbonate, and ammonium carbonate; and
   the emulsifier described in step (3) is one or more of, sodium alkylbenzenesulfonate, agricultural milk 400, and polyethylene glycol.

7. The method of claim 1, wherein:
   the iron-containing compound described in step (1) is one of a ferric salt and a ferrous salt, or a mixture thereof, the ferric salt being ferric chloride, ferric nitrate, or ferric citrate, the ferrous salt being ferrous sulfate or ferrous chloride; and
   the selenium-containing compound described in step (1) is one or more of selenic acid, selenate, seleninic acid, and selenite.

8. A ferrous modified selenium sol for inhibiting accumulation of cadmium and arsenic in rice prepared by the method according to claim 1.

9. A method of inhibiting accumulation of cadmium and arsenic in rice, comprising:
   applying the ferrous modified selenium sol according to claim 8 in the field of heavy metal pollution treatment technology.

10. The method of claim 9, wherein applying the ferrous modified selenium sol in the field of heavy metal pollution treatment technology comprises:
   after the ferrous modified selenium sol is diluted with water, it is atomizingly sprayed 1-3 times onto rice leaves at a tillering, jointing, and/or filling stages of the rice, which is performed at 4-6 pm on sunny or cloudy days; and
   the volume ratio of the ferrous modified selenium sol for inhibiting the accumulation of cadmium and arsenic in rice to water is 1:(50-250), and the spraying dose of the ferrous modified selenium sol for inhibiting the accumulation of cadmium and arsenic in rice after dilution is 50-150 L/mu.

* * * * *

UNITED STATES PATENT AND TRADEMARK OFFICE
CERTIFICATE OF CORRECTION

PATENT NO. : 10,899,631 B2  
APPLICATION NO. : 16/863442  
DATED : January 26, 2021  
INVENTOR(S) : Fangbai Li et al.

It is certified that error appears in the above-identified patent and that said Letters Patent is hereby corrected as shown below:

On the Title Page

Item (73), Assignee, Line 3, delete "TECHNOLOGY" and insert -- TECHNOLOGY, (CN) --

In the Claims

Column 18, Line 46, Claim 10, delete "ata" and insert -- at a --

Signed and Sealed this  
Twentieth Day of July, 2021

Drew Hirshfeld  
*Performing the Functions and Duties of the*  
*Under Secretary of Commerce for Intellectual Property and*  
*Director of the United States Patent and Trademark Office*

SEQUENCE LISTING

<160> NUMBER OF SEQ ID NOS: 10

<210> SEQ ID NO 1
<211> LENGTH: 20
<212> TYPE: DNA
<213> ORGANISM: Artificial Sequence
<220> FEATURE:
<223> OTHER INFORMATION: OsNramp5 primer forward

<400> SEQUENCE: 1
tgagctgctc tgggtgattc                                                  20

<210> SEQ ID NO 2
<211> LENGTH: 20
<212> TYPE: DNA
<213> ORGANISM: Artificial Sequence
<220> FEATURE:
<223> OTHER INFORMATION: OsNramp5 primer backward

<400> SEQUENCE: 2
tgccagcagc cataggaaaa                                                  20

<210> SEQ ID NO 3
<211> LENGTH: 20
<212> TYPE: DNA
<213> ORGANISM: Artificial Sequence
<220> FEATURE:
<223> OTHER INFORMATION: OsLCT1 primer forward

<400> SEQUENCE: 3
tggcgatctt tggaggcttt                                                  20

<210> SEQ ID NO 4
<211> LENGTH: 20
<212> TYPE: DNA
<213> ORGANISM: Artificial Sequence
<220> FEATURE:
<223> OTHER INFORMATION: OsLCT1 primer backward

<400> SEQUENCE: 4
cgccgaggtc gataagaaca                                                  20

```
<210> SEQ ID NO 5
<211> LENGTH: 20
<212> TYPE: DNA
<213> ORGANISM: Artificial Sequence
<220> FEATURE:
<223> OTHER INFORMATION: OsHMA3 primer forward

<400> SEQUENCE: 5
agaacagcag gtcgaagacg                                               20

<210> SEQ ID NO 6
<211> LENGTH: 20
<212> TYPE: DNA
<213> ORGANISM: Artificial Sequence
<220> FEATURE:
<223> OTHER INFORMATION: OsHMA3 primer backward

<400> SEQUENCE: 6
attgctcaag gccatctgct                                               20

<210> SEQ ID NO 7
<211> LENGTH: 21
<212> TYPE: DNA
<213> ORGANISM: Artificial Sequence
<220> FEATURE:
<223> OTHER INFORMATION: OsLsi1 primer forward

<400> SEQUENCE: 7
cggtggatgt gatcggaacc a                                             21

<210> SEQ ID NO 8
<211> LENGTH: 21
<212> TYPE: DNA
<213> ORGANISM: Artificial Sequence
<220> FEATURE:
<223> OTHER INFORMATION: OsLsi1 primer backward

<400> SEQUENCE: 8
cgtcgaactt gttgctcgcc a                                             21

<210> SEQ ID NO 9
<211> LENGTH: 19
<212> TYPE: DNA
<213> ORGANISM: Artificial Sequence
<220> FEATURE:
<223> OTHER INFORMATION: OsLsi2 primer forward

<400> SEQUENCE: 9
atctgggact tcatggccc                                                19

<210> SEQ ID NO 10
<211> LENGTH: 19
<212> TYPE: DNA
<213> ORGANISM: Artificial Sequence
<220> FEATURE:
<223> OTHER INFORMATION: OsLsi2 primer backward

<400> SEQUENCE: 10
acgtttgatg cgaggttgg                                                19
```